(12) United States Patent  
Salminen et al.

(10) Patent No.: US 9,597,690 B2  
(45) Date of Patent: Mar. 21, 2017

(54) MINERAL MATERIAL PROCESSING PLANT AND A METHOD FOR OPERATING A PROCESSING PLANT

(71) Applicant: Metso Minerals, Inc., Helsinki (FI)

(72) Inventors: Vesa-Matti Salminen, Kangasala (FI); Jouni Koivumaki, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 14/237,417

(22) PCT Filed: Sep. 4, 2013

(86) PCT No.: PCT/FI2013/050855  
§ 371 (c)(1),  
(2) Date: Feb. 6, 2014

(87) PCT Pub. No.: WO2015/033013  
PCT Pub. Date: Mar. 12, 2015

(65) Prior Publication Data  
US 2016/0199850 A1    Jul. 14, 2016

(51) Int. Cl.  
*B02C 21/02* (2006.01)  
*B02C 23/08* (2006.01)  
(Continued)

(52) U.S. Cl.  
CPC .............. *B02C 21/02* (2013.01); *B02C 23/08* (2013.01); *B07B 1/005* (2013.01); *B65G 21/10* (2013.01)

(58) Field of Classification Search  
CPC ......... B02C 21/02; B02C 23/08; B65G 21/10; B07B 1/005  
(Continued)

(56) References Cited

U.S. PATENT DOCUMENTS 4,478,372 A * 10/1984 Paterson ................. B02C 21/00  
241/135  
4,598,875 A    7/1986 Bronson et al.  
(Continued)

FOREIGN PATENT DOCUMENTS

JP         1-85623 A       4/1998  
WO      01/34314 A1       5/2001  
(Continued)

OTHER PUBLICATIONS

PCT International Search Report dated Oct. 23, 2014.  
(Continued)

*Primary Examiner* — Faye Francis  
(74) *Attorney, Agent, or Firm* — Andrus Intellectual Property Law, LLP (57) ABSTRACT

A mineral material processing plant includes a mineral material processing apparatus and a first conveyor which is arranged to feed the processing apparatus during operation of that processing apparatus. The first conveyor includes a first material transport part, a second material transport part and a pivot by which the second material transport part is fixed in relation to the first material transport part. The first conveyor is pivotable to an operation position in which the transported material is arranged to be fed via a discharge end of the second material transport part to the processing apparatus and to a service position which is in a first pivoting direction in relation to the operation position. In the service position, the projection of the discharge end of the second material transport part is arranged to leave free the lifting center of the processing apparatus when viewed from above. A method for operating a processing plant is also disclosed.

18 Claims, 5 Drawing Sheets

(51) Int. Cl.
  *B07B 1/00* (2006.01)
  *B65G 21/10* (2006.01)

(58) Field of Classification Search
  USPC .................. 241/186.35, 186.4, 223; 198/632
  See application file for complete search history.

(56) References Cited

U.S. PATENT DOCUMENTS

| | | | | |
|---|---|---|---|---|
| 5,044,484 A * | 9/1991 | Douglas | B65G 41/002 | |
| | | | 198/313 | |
| 5,360,097 A * | 11/1994 | Hibbs | B65G 41/005 | |
| | | | 198/313 | |
| 5,662,210 A | 9/1997 | Toews | | |
| 6,119,847 A * | 9/2000 | Mooney | B65G 33/32 | |
| | | | 198/313 | |
| 6,296,109 B1 * | 10/2001 | Nohl | B65G 21/14 | |
| | | | 198/632 | |
| 6,302,265 B1 * | 10/2001 | Cunningham | B65G 21/14 | |
| | | | 198/313 | |
| 6,705,449 B2 * | 3/2004 | Wagstaffe | B07B 1/005 | |
| | | | 198/313 | |
| 6,708,814 B2 * | 3/2004 | Wagstaffe | B65G 21/14 | |
| | | | 198/581 | |
| 6,910,586 B2 * | 6/2005 | McCloskey | B07B 1/005 | |
| | | | 198/313 | |
| 7,347,311 B2 * | 3/2008 | Rudge | B65G 21/14 | |
| | | | 198/313 | |
| 7,744,337 B2 * | 6/2010 | Kaufmann | B65G 59/02 | |
| | | | 198/592 | |
| 8,113,332 B2 * | 2/2012 | Devlin | B07B 1/005 | |
| | | | 198/313 | |
| 8,403,147 B2 * | 3/2013 | Sauser | B02C 21/02 | |
| | | | 198/617 | |
| 8,770,386 B2 * | 7/2014 | Berning | B65G 21/14 | |
| | | | 198/313 | |
| 8,833,539 B2 * | 9/2014 | Fehr | B65G 21/14 | |
| | | | 198/313 | |
| 2003/0121761 A1 * | 7/2003 | Wagstaffe | B65G 21/14 | |
| | | | 198/632 | |
| 2003/0226919 A1 | 12/2003 | Brock et al. | | |
| 2007/0158479 A1 | 7/2007 | Westerman et al. | | |
| 2007/0267273 A1 * | 11/2007 | Walsh | B65G 21/14 | |
| | | | 198/632 | |
| 2013/0248329 A1 * | 9/2013 | Berning | E01C 23/088 | |
| | | | 198/632 | |
| 2015/0217942 A1 * | 8/2015 | Saarinen | B65G 21/14 | |
| | | | 198/313 | |

FOREIGN PATENT DOCUMENTS

WO 2009/039559 A1 4/2009
WO 2011065915 A1 6/2011

OTHER PUBLICATIONS

Patent Abstracts of Japan.
"Nordberg NW Series Portable Plants for Closed Circuit Crushing", Brochure No. 1415-03-03-SAM/Sorocaba-English, 2008, Metso Minerals.

* cited by examiner

Fig. 15

MINERAL MATERIAL PROCESSING PLANT AND A METHOD FOR OPERATING A PROCESSING PLANT

CROSS-REFERENCE TO RELATED APPLICATIONS

This application claims priority to PCT/FI2013/050855, filed Sep. 4, 2013, and published in English on ______ as publication number ______, incorporated herein by reference.

TECHNICAL FIELD

The invention relates to mineral material processing. The invention relates particularly, though not exclusively, to conveyor solutions in a mineral material processing plant.

BACKGROUND ART

Mineral material, for example rock, is gained from the earth for crushing by exploding or excavating. The rock can also be natural rock and gravel or construction waste. Mobile crushers and stationary crushing applications are used in crushing. An excavator or wheeled loader loads the material to be crushed into the crushers feed hopper from where the material to be crushed may fall in a jaw of a crusher or a feeder moves the rock material towards the crusher. The material to be crushed may also be recyclable material such as concrete, bricks, or asphalt.

A conveyor often increases the length, width and/or height of the plant in a movable mineral material processing plant. Therefore the conveyor may be positioned in another location during operation than during transport or service of the plant. Moving the conveyor from the operation position of the plant to the transport or service position of the plant requires in some cases detaching of the conveyor from place. Additionally the conveyor is fixed to the plant for the transport. In many cases the entire conveyor must be moved from its location, for example in order to keep the conveyor inside transport dimensions (height, width, length) which are allowed or require a permission in road traffic.

In some known mineral material processing plants a crusher/screen is fed by a conveyor which is moved to a transport/service position by moving the conveyor towards a feeding end and downwards. Moving mechanisms used for the moving of the conveyor are heavy and expensive constructions. The moving of the conveyor away from the crusher requires space at the feeding end of the plant which may be problematic if the plant in question is a mobile crushing plant which is operating in a process of several plants and a feeding plant is close to a receiving plant. The feeding plant must then be moved before service of the receiving plant. Sliding mechanisms and telescopic operating legs are used for longitudinal moving of the conveyor in the plant. The sliding mechanisms tolerate poorly dirty circumstances and are sensitive with respect to production inaccuracy.

In a known movable crushing and screening plant the material which is crushed in a crusher is circulated by conveyors in a closed loop from the crusher to a screen. The overs of the screen is guided to the crusher. The product passing through the screen can be guided to further processing in the same plant or another plant which processes mineral material, or to a pile. A long single part conveyor is used in this closed loop plant for feeding the screen which conveyor is moved to a transport position by cylinder operations. The long conveyor which is feeding the screen is at side of the crusher what increases transport width and causes that when the screen is fed the material has to be moved sideways from a main conveyor to a feed conveyor for example by a vibration chute or hopper. Then the process includes an extra wearing part (vibration chute, hopper) and the material arrives to the screen from a side direction wherein spreading of the material evenly on the screen is problematic. Alternatively the plant must include an expensive, heavy, and often unreliable moving mechanism by which the conveyor can be moved off the crusher for transport and service of the crusher. Alternatively the conveyor has to be lifted by a separate hoist which must be brought beside the plant what is costly and time consuming.

An object of the invention is to avoid or at least reduce problems present in connection with prior art. An object of the invention is to provide new technical alternatives. An object of the invention is to simplify and speed up moving of a conveyor between transport and operation positions. An object of the invention is to enhance serviceability of a mineral material processing plant. An object of the invention is to enhance operation reliability, usability and transportability of a mineral material processing plant. An object of the invention is to simplify a mineral material processing plant. An object of the invention is to enhance processing of mineral material i.a. by shortening shutdown time.

SUMMARY

According to a first aspect of the invention there is provided a mineral material processing plant which comprises a mineral material processing apparatus and a first conveyor which is arranged to feed the processing apparatus during operation of that processing apparatus which first conveyor comprises a first material transport part, and the first conveyor comprises a second material transport part and a pivot by which the second material transport part is fixed pivotably in relation to the first material transport part to an operation position in which the transported material is arranged to be fed via a discharge end of the second material transport part to the processing apparatus; and to a service position which is in a first pivoting direction in relation to the operation position, and in the service position the projection of the discharge end of the second material transport part is arranged to leave free the lifting centre of the processing apparatus when viewed from above.

Preferably the second material transport part is fixed in relation to the first material transport part pivotably to a transport position which is substantially perpendicular to a vertical centre axis of the processing apparatus and substantially parallel with a longitudinal axis of the processing apparatus, and Preferably the second material transport part is fixed by the pivot in relation to the first material transport part pivotably to a transport position which is in an opposite pivoting direction of the second material transport part in relation to the operation position, and in the transport position the discharge end of the second material transport part is close to the processing apparatus in a height which substantially is not exceeding the height which is defined by the highest point of the processing apparatus and a feed hopper of the processing apparatus during operation thereof.

Preferably the service position enables lifting of the processing apparatus (for example a crusher or a wear part of a crusher) for example in connection with service. Preferably in the service position the projection of the discharge end, when viewed from above, does not meet the projection of the processing apparatus or is arranged to leave free the projection of the processing apparatus. Preferably, when the processing apparatus or a part of the processing apparatus is lifted from a centre/gravity centre, a lifting space is freed up for a lifting wire at least at the gravity centre of the processing apparatus.

Preferably the processing plant comprises as the processing apparatus a crusher or a screen, or both the crusher and the screen.

Preferably the processing plant comprises as a first processing apparatus a crusher and as a second processing apparatus a screen.

Preferably the operation position between the transport position and the service position further comprises a feeding position of the second material transport part to a second conveyor which is connected in succession to the first conveyor and arranged to feed a second processing apparatus.

Preferably the processing plant comprises as the processing apparatus a crusher and further a motor module which is beside the crusher and the material feeding by the second material transport part is arranged above the motor module.

Preferably in the service position the projection of the discharge end of the second material transport part is arranged to leave free the lifting centre of the motor module when viewed from above.

Preferably the service position thus further enables lifting of the motor module for example in connection with service without dismounting the conveyor. Preferably in the service position the projection, when viewed from above, of the discharge end is arranged to leave free the projection of the motor module. Preferably, when the motor module is lifted from a centre/gravity centre, a lifting space is freed up for a lifting wire at least at the gravity centre of the motor module.

Preferably the first conveyor comprises a hydraulic actuator or a pair of hydraulic actuators which is arranged to pivote the second material transport part in relation to the first material transport part.

Preferably the hydraulic actuator is a hydraulic cylinder. All positions of the first conveyor (operation, transport and service position) can be reached simply by operating just one actuator with changeable length or two expandable and retractable actuators acting as a pair.

Preferably the first conveyor comprises a dust cover which is formed on the first and second material transport parts and which is foldable at the pivot.

Preferably the first conveyor comprises a feed hopper for feeding material to the processing plant. Preferably the feed hopper is fixed to the first material transport part.

Preferably the first conveyor comprises an endless transport member which is forming a continuing transport surface over the first material transport part and the second material transport part.

Preferably the first conveyor comprises a first endless transport member in the first material transport part and a second endless transport member in the second material transport part which endless transport members are forming successive transport surfaces over the first conveyor.

Preferably the processing apparatus comprises a processing apparatus feed hopper which comprises an open pivotable side, and the discharge end of the first material transport part is set in the transport position in between the sides of the feed hopper through the open pivotable side.

Preferably the mineral material processing plant is a movable crushing plant.

According to a second aspect of the invention there is provided a method for operating a mineral material processing plant which processing plant comprises a mineral material processing apparatus and a first conveyor by which the processing apparatus is fed during operation of that processing apparatus, which first conveyor comprises a first material transport part, and the first conveyor comprises a second material transport part and a pivot by which the second material transport part is fixed pivotably in relation to the first material transport part, and pivoting the second material transport part to an operation position for the time of operation, in which operation position the transported material is be fed via a discharge end of the second material transport part to the processing apparatus; and to a service position in a first pivoting direction in relation to the operation position, wherein the projection of the discharge end of the second material transport part leaves free the lifting centre of the processing apparatus when viewed from above.

Preferably pivoting the second material transport part for the time of the transport to a transport position which is, compared to the service position, in an opposite pivoting direction of the second material transport part in relation to the operation position wherein the discharge end of the second material transport part is close to the processing apparatus in a height which substantially does not exceed the height which is defined by the highest point of the processing apparatus and a feed hopper of the processing apparatus during operation thereof.

Preferably operating the processing plant in crushing with a crusher or in screening with a screen, or both in crushing and screening.

Preferably feeding in the operation position material by the second material transport part to a second conveyor which is connected in succession to the first conveyor and to feed a second processing apparatus.

Preferably pivoting the second material transport part in relation to the first material transport part by a hydraulic actuator or a pair of hydraulic actuators comprised by the first conveyor.

Preferably opening an open pivotable side of a feed hopper comprised by the processing apparatus, and setting in the transport position the discharge end of the first material transport part in between the sides of said feed hopper through the open pivotable side.

Preferably the crusher is any of the following: a jaw crusher, a horizontal shaft impactor, a vertical shaft impactor, a gyratory crusher, a cone crusher.

Preferably the mineral material processing plant is a movable processing plant such as a movable screening and crushing plant.

The first conveyor operated for feeding of the process has a pivot and the pivoting of the conveyor end in the transport position (transport height) is enabled by using the pivot, without moving from place or dismounting the entire conveyor.

Taking advantage of the pivot the end of the conveyor can be pivoted upwards which enables a better service space around and above the crusher, for example for operating a lifting apparatus when replacing wear parts.

The crusher can be fed directly by the first conveyor or, depending on the machine, for example a second conveyor which in turn feeds for example a screen.

Expensive and inconvenient mechanisms intended to move the conveyor are left away from the construction. Anyway, one does not need to compromise the service space above the crusher.

The same first conveyor can be used both in plants with and without a screen.

The transport dimensions of the plant do not increase when the first conveyor does not need to be moved longitudinally and/or laterally in relation to the plant.

Serviceability of the plant is facilitated and speeded up when more space can be added between the conveyor and the service target.

The operation position of the first conveyor in relation to the crusher and/or the screen can be optimized suitably according to each intended operation when the pivoting mechanism of the conveyor can be utilized to form several positions. If necessary, the first conveyor can be adjusted to a suitable position in relation to the second conveyor to deliver material onto the second conveyor, for example in a case where a second conveyor above a screen is moved with the screen when the inclination of the screen is adjusted.

The operation, transport and service positions can be implemented with one pivot.

Different embodiments of the present invention will be illustrated or have been illustrated only in connection with some aspects of the invention. A skilled person appreciates that any embodiment of an aspect of the invention may apply to the same aspect of the invention and other aspects alone or in combination with other embodiments as well.

BRIEF DESCRIPTION OF THE DRAWINGS

The invention will be described, by way of example, with reference to the accompanying drawings.

DETAILED DESCRIPTION

In the following description, like numbers denote like elements. It should be appreciated that the illustrated drawings are not entirely in scale, and that the drawings mainly serve the purpose of illustrating some example embodiments of the invention.

Figure 1:
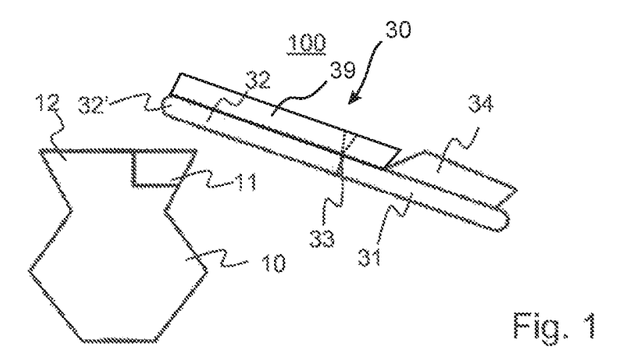
FIG. 1 shows a mineral material processing plant according to a first preferable embodiment of the invention where a first conveyor is in an operation position feeding a crusher.

FIG. 1 shows a mineral material processing plant 100 where a first conveyor 30 feeding a crusher 10 and acting as a processing apparatus pivots due to a pivot 33 to transport, operation and service positions. The first conveyor comprises a first material transport part 31 and a second material transport part 32 and the pivot 33 by which the second material transport part is fixed pivotably in relation to the first material transport part.

According to a preferable embodiment the first conveyor 30 comprises an endless transport member such as a belt which forms a continuing transport surface over the first material transport part 31 and the second material transport part 32.

According to another preferable embodiment the first conveyor 30 comprises a first endless transport member such as a first belt in the first material transport part 31 and a second endless transport member such as a second belt in the second material transport part 32 which are forming successive transport surfaces over the first conveyor.

The first conveyor comprises further a feed hopper 34 for feeding material to the processing plant in FIG. 1. The feed hopper is fixed to the first material transport part 31 in FIG. 1. During operation the highest point of the crusher 10 is defined by a feed hopper 12 which is fixed to the crusher or fixedly integrated to an upper frame of the crusher which feed hopper comprises an open pivotable side 11 at place of the second material transport part 32 of the first conveyor 30.

The second material transport part can be pivoted to a transport position which is in a second pivoting direction in relation to the operation position and in which a discharge end of the second material transport part is close to the processing apparatus 10 in a height which substantially does not exceed that height which is defined by the highest point during operation of the processing apparatus and the feed hopper 12 of the processing apparatus. In the transport position sides of the processing apparatus such as the crusher may be pivoted downwards from the operation position towards the upper frame of the crusher.

According to some preferable embodiments the first conveyor 30 comprises a dust cover 39 which is formed on the first 31 and second 32 material transport parts and which is foldable at the pivot 33 forming preferably a connected dust shielding above the transport surface of the first conveyor.

Figure 6:
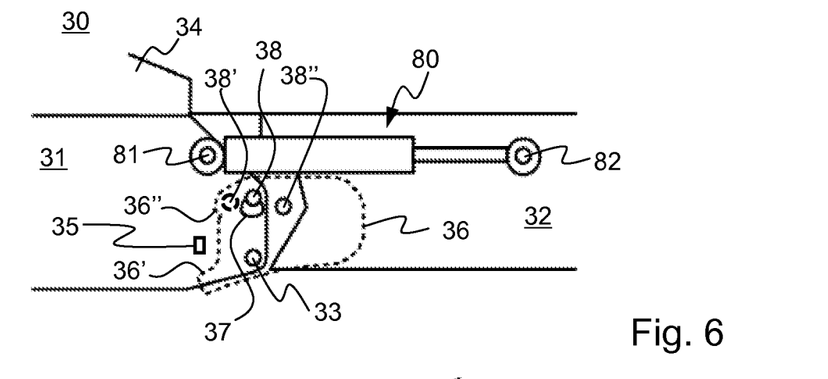
FIGS. 6-8 show a first conveyor according to a preferable embodiment at the region of a pivot in different positions.

FIG. 1 shows a first position as the operation position where the material to be conveyed is arranged to be fed via the discharge end 32' of the second material transport part directly to the crusher 10. An example of the pivot 33 region of the first conveyor 30 in the first position is shown in FIG. 6.

Figure 4:
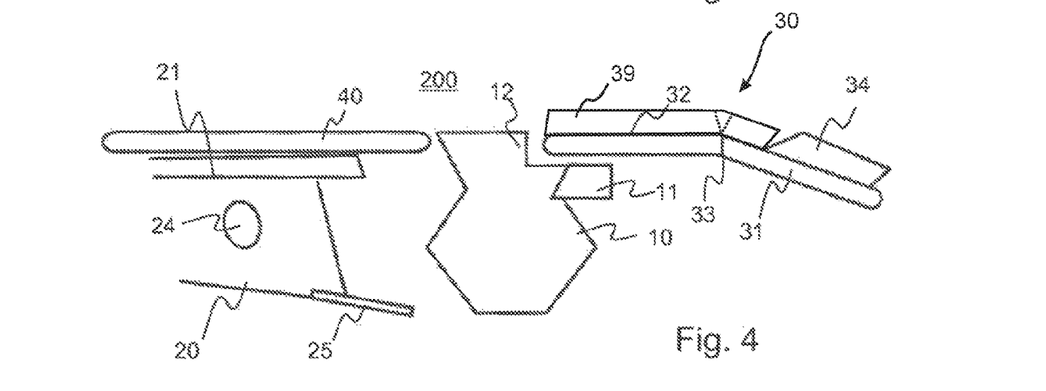
FIG. 4 shows the processing plant of FIG. 2 in a transport position.
Figure 8:
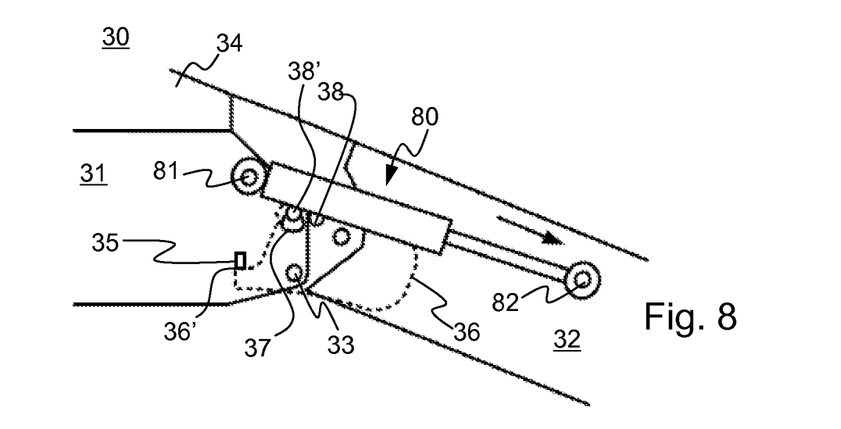
Figure 10:
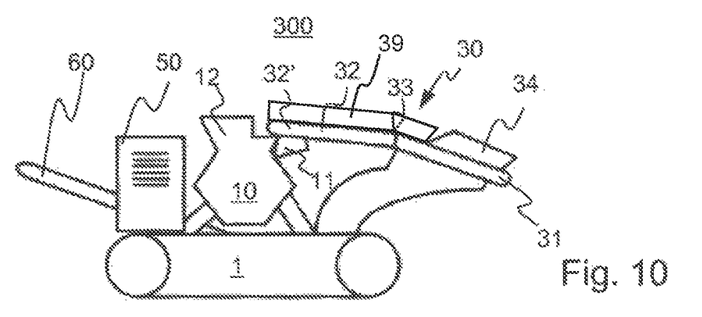
Figure 14:
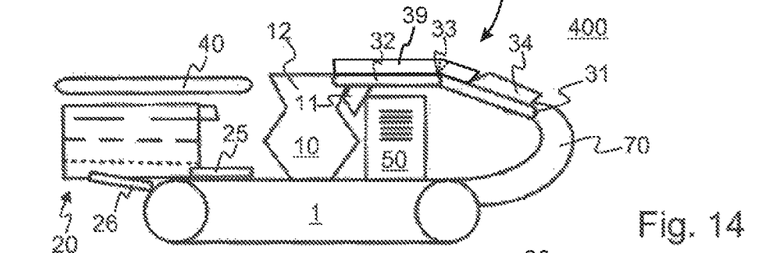

During the transport of the processing plant the second material transport part 32 is pivoted in a second position (transport position). An example of the pivot 33 region of the first conveyor 30 in the second position is shown in FIG. 8. In the second position the second material transport part is pivoted in the second pivoting direction in relation to the first position and the discharge end 32' of the second material transport part is close to the crusher 10 in a height which substantially does not exceed the height of the highest point of the crusher as is shown in FIGS. 4, 10 and 14. According to a preferable embodiment through the open pivotable side 11 in between the sides of the feed hopper of the crusher 10.

FIGS. 2-5 show a processing plant 200 which comprises the crusher 10 and a screen 20. Preferably the crusher or the screen, or both simultaneously can be operated in the processing plant 200 as the processing apparatus.

Figure 2:
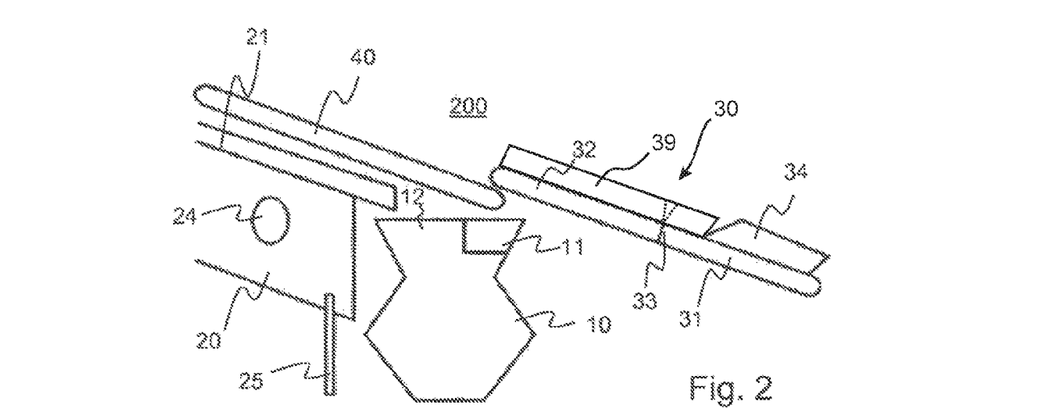
FIG. 2 shows a mineral material processing plant according to a second preferable embodiment of the invention comprising a crusher and a screen and where a first conveyor is during screening and crushing in an operation position feeding the screen via a second conveyor.

In FIG. 2 the first conveyor 30 is during screening and crushing in the operation position feeding via a second conveyor 40 the screen 20 which feeds the crusher 10. Crushable material is brought from outside to the processing plant 200 into the feed hopper 34 of the first conveyor 30 or directly into the crusher 10 or in both 10, 34. The screen 20 comprises a first screen deck 21 and a desired number underneath screen decks. The overs of the screen deck 21 is guided from the screen to the crusher. The screen 20 comprises a vibrator 24 such as a vibration unit for achieving a screening movement to the screen deck. The screen 20 comprises support arms 25 to move the screen and the second conveyor 40 to the operation position and off the operation position. Preferably the screen 20 is a multi-deck screen such as a 2-, 3- or 4-deck screen where the mesh dimension of an underneath screen deck is smaller than the mesh dimension of an above screen deck, and preferably the first screen deck 21 is the uppermost screen deck.

Figure 3:
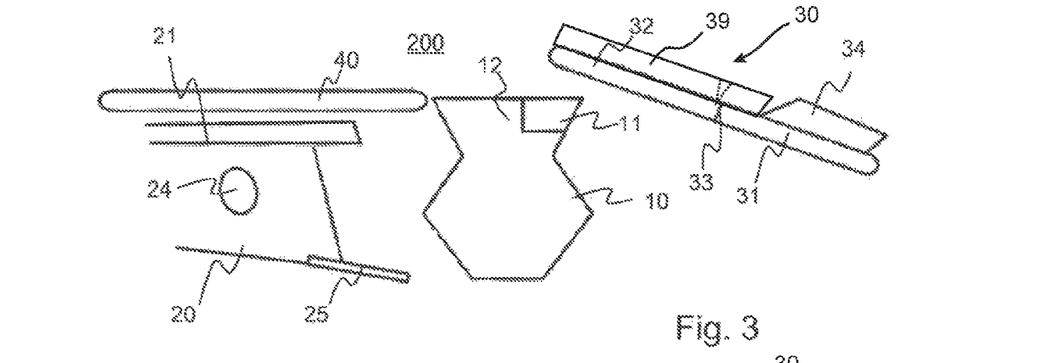
FIG. 3 shows the processing plant of FIG. 2 where the first conveyor is in an operation position feeding the crusher, and the screen is not operated during the crushing.

In FIG. 3 the first conveyor 30 of the processing plant 200 is in the operation position feeding directly the crusher 10 as in FIG. 1. The screen 20 is not operated during the crushing in the position of FIG. 3. The screen 20 is moved away from the operation position by the support arms 25 and supported by the support arms which are pivotable in the longitudinal direction of the plant 200, and lowered closer to a frame (not shown in FIGS. 2-5) of the plant, and the second conveyor 40 is moved away from a feeding connection of the first conveyor 30. Preferably a starting end of the second conveyor 40 is moved to the other side of the crusher than the first conveyor when viewed in the longitudinal direction of the plant, wherein the second conveyor can be lowered closer to the screen and the transport height of the plant is decreasing. The screen is then not fed by the first conveyor and the screen cannot feed the crusher. Alternatively the screen can be kept in place and the second conveyor can be moved away from the feeding connection of the first conveyor.

In FIG. 4 the first conveyor 30 of the processing plant 200 is in the transport position pivoted to the second position (downwards). The second conveyor 40 is lowered from the position of the FIG. 3 further downwards closer towards the uppermost screen deck 21 of the screen, preferably in between sides located at the sides of the screen, wherein the second conveyor 40 is also in the transport position. The discharge end 32' of the second material transport part 32 of the first conveyor 30 is lowered, through an opening which is formed by an open pivoted side 11 of the feed hopper of the crusher 10, in between the sides of the feed hopper, preferably on the crusher. Then, the highest points of the first conveyor 30 and the second conveyor 40 are in such a height which substantially does not exceed the height defined by the highest point of the processing apparatus. In case of FIG. 4 the highest point, that is the transport height, of the plant 200 is defined by the side of the feed hopper of the crusher.

Preferably a longitudinal axis of the second material transport part intersects a vertical centre axis of the processing apparatus such as the crusher substantially perpendicularly and is substantially parallel with a longitudinal axis of the second conveyor and a longitudinal axis of the processing apparatus.

Figure 5:
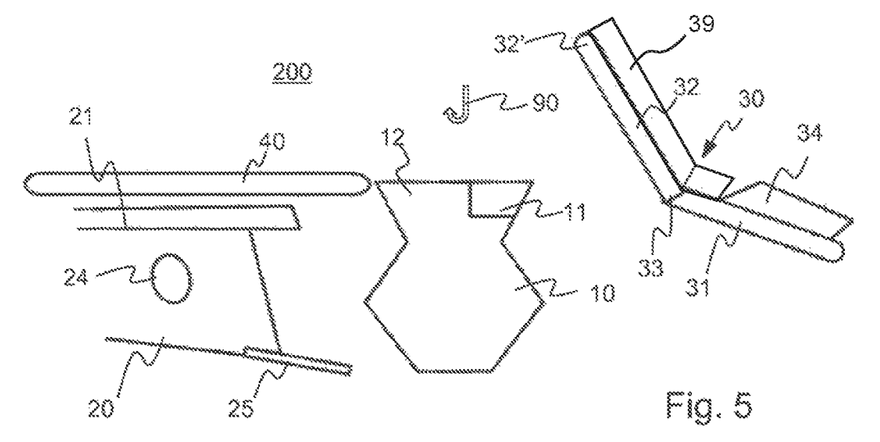
FIG. 5 shows the processing plant of FIG. 2 in a service position.

FIG. 5 shows the processing plant 200 of FIG. 2 wherein the discharge end 32' of the second material transport part 32 is pivoted from the position of FIG. 3 to an opposite pivoting direction in relation to the first position (upwards) for example for service. In this third position the projection of the discharge end of the second material transport part is arranged to leave free the lifting centre of the processing apparatus when viewed from above. A lifting apparatus 90 such as a lifting rope and a gripping member do not hit the second material transport part 32 during lifting. Then, for example the crusher can be lifted from place slightly upwards and thereafter sideways to the side of the processing plant. The third position enables lifting the crusher or a wear part of the crusher without having to remove from place or detach the first conveyor 30. Preferably in the third position the projection of the discharge end when viewed from above does not meet the projection of the processing apparatus or is arranged to leave free the projection of the processing apparatus. Preferably, when the processing apparatus or a part of the processing apparatus is lifted from a centre/gravity centre, a lifting space is freed up for a lifting wire at least at the gravity centre of the processing apparatus.

Figure 7:
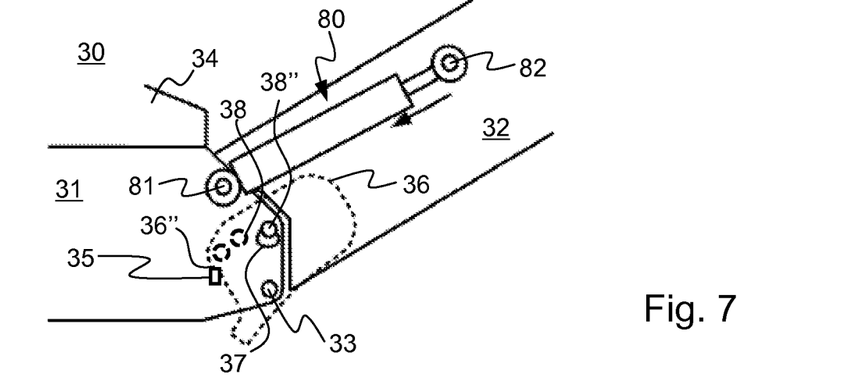

FIGS. 6-8 show the first conveyor 30 in different positions. The conveyor 30 can be applied in the processing plants 100, 200, 300, 400 shown in the FIGS. 1-5 and 9-15. The first conveyor comprises a hydraulic actuator 80 or a pair of hydraulic actuators which is arranged to pivote the second material transport part 32 in relation to the first material transport part 31. Preferably the first material transport part 31 is fixed to the frame of the processing plant 100, 200, 300, 400 and does not necessarily need to be moved in relation to the frame.

In FIGS. 6-8 the hydraulic actuator is a hydraulic cylinder 80 which is preferably two double-acting, i.e. retractable and expandable. All positions of the first conveyor 30 (operation, transport and service position) can be reached simply by operating just one hydraulic actuator or two expandable and retractable actuators acting as a pair which can be located parallel at different sides of the conveyor.

A first end 81 of the hydraulic cylinder is attached to the first material transport part 31, preferably above the pivot 33. A second end 82 of the hydraulic cylinder is attached to the second material transport part 32, preferably above the pivot 33. The second material transport part 32 is pivoted around the pivot 33 and in relation to the first material transport part 31 by lengthening and shortening the hydraulic cylinder.

The first conveyor 30 comprises a limiting device which comprises a stop member 36 with a first stop surface 36' and a second stop surface 36", and a stopper 35. The stop member and the stopper together limit a movement range of the second material transport part 32. The limiting device 36 is fixed to the second material transport part 32 and the stopper 35 to the first material transport part 31 in FIGS. 6-8 but they may be located also vice versa to the material transport parts at different sides of the pivot 33.

The first conveyor 30 comprises a locking device by which the material transport parts can be locked relative to each other in desired first, second and third positions when the material transport parts are pivoted by the hydraulic cylinder 80 to said positions. The locking device comprises in the embodiments of FIGS. 6-8 a pin 37 which is adapted to a hole located in the first material transport part 31 and which can be pushed to a first counter hole 38, second counter hole 38' and a third counter hole 38" located in the second material transport part 32 corresponding to the positions of the second material transport part 32. The pin 37 can be locked for example by a cotter (not shown) in place. Preferably a gripping handle is arranged in the pin 37 for the sake of easier handling.

The limiting device 35, 36 and the locking device 37, 38', 38" are arranged to operate together so that in the second and third position of the material transport part 32 the limiting device stops the second material transport part at the latest at borders of the movement range at the extreme limit of the movement range. So the stopping surface 36', 36" can be driven by the actuator 80 against the stopper 35 and the achieved position can be locked by the locking device.

According to a preferable embodiment that parts of the limiting device and the locking device which move with the second material transport part 32 are formed to the stop member 36. So it is easily possible to change the limits of the movement path of the second material transport part to correspond requirements present in different application locations, plants, and, by replacing to the first conveyor 30 a stop member 36 having such counter holes 38, 38', 38" and stop surfaces 36', 36" that are placed in desired points.

In FIG. 6 the second material transport part 32 is in the first position (operation position) wherein the pin 37 is mounted in the first counter hole 38 and the cylinder 80 is at the centre region of the movement.

FIG. 8 shows the second position (transport position) where the first stop surface 36' is against the stopper 35 from below, the pin 37 is mounted to the second counter hole 38' and the cylinder 80 is expanded.

FIG. 7 shows the third position (service position) where the second stop surface 36" is against the stopper 35 from above, the pin 37 is mounted to the third counter hole 38" and the cylinder 80 is retracted.

Figure 9:
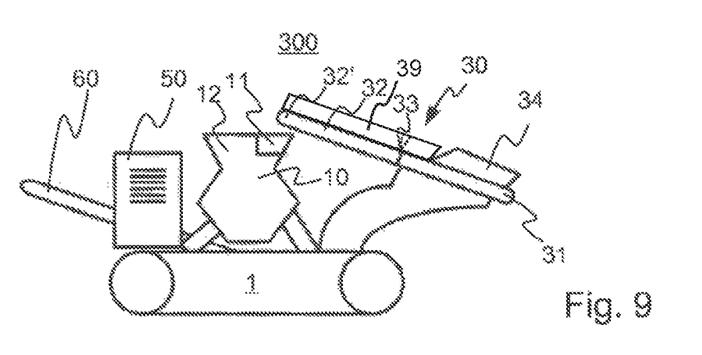
FIGS. 9-11 show a mineral material processing plant according to a third embodiment of the invention in different positions of the first conveyor.
Figure 11:
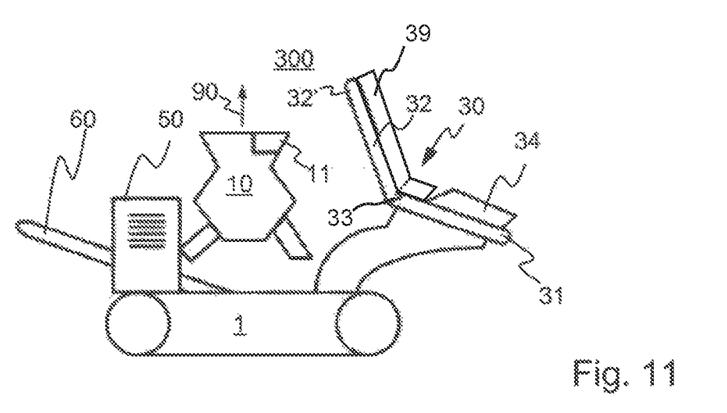

FIGS. 9-11 show a processing plant 300 which comprises a frame 1 and a crusher 10 fixed to the frame, a first conveyor 30, a motor module 50 and a discharge conveyor 60. The frame 1 comprises in this embodiment further a track base for moving the processing plant.

The first conveyor 30 is during crushing in the operation position feeding the crusher 10 in FIG. 9. Material to be crushed is brought from outside to the plant 300 to the feed hopper 34 of the first conveyor 30 or directly to the crusher 10 or both 10, 34. The crushed material ends outside the plant 300 by the discharge conveyor 60.

In FIG. 10 the first conveyor 30 of the processing plant 300 is in the transport position pivoted to the second position (downwards). The discharge end 32' of the second material transport part 32 of the first conveyor 30 is lowered, through an opening which is formed by an open pivoted side 11 of the feed hopper of the crusher 10, in between the sides of the feed hopper, preferably on the crusher. Then, the highest point of the first conveyor 30 substantially does not exceed the height defined by the highest point of the processing apparatus. In case of FIG. 10 the highest point, i.e. the transport height, of the plant 300 is defined by the side of the feed hopper of the crusher.

In FIG. 11 the discharge end 32' of the second material transport part 32 of the processing plant 300 is pivoted from the position of FIG. 10 to an opposite pivoting direction in relation to the first position (upwards) for example for service. In this third position the projection of the discharge end of the second material transport part is arranged to leave free the lifting centre of the processing apparatus when viewed from above. A lifting apparatus 90 such as a lifting rope and a gripping member do not hit the second material transport part 32 during lifting. Then for example the crusher can be lifted from place slightly upwards and thereafter in side direction to the side of the processing plant. The third position enables the lifting of the crusher or a wear part of the crusher without having to remove from place or detach the first conveyor 30. Preferably in the third position the projection of the discharge end when viewed from above does not meet the projection of the processing apparatus or is arranged to leave free the projection of the processing apparatus. Preferably, when the processing apparatus or a part of the processing apparatus is lifted from a centre/gravity centre, a lifting space is freed up for a lifting wire at least at the gravity centre of the processing apparatus.

FIGS. 12-15 show a processing plant 400 which comprises a frame 1 and a crusher 10 fixed to the frame, a motor module 50, a first conveyor 30, a second conveyor 40 and a screen 20.

Additionally to the presentation of FIGS. 2-5 the frame 1 and the motor module 50 are shown in the processing plant 400 of FIGS. 12-15. The motor module 50 is beside the crusher and material feed by the second material transport part 32 is arranged above the motor module. The screen 20 is presented as a multilayer screen which comprises a first screen deck 21, a second screen deck 22 and a third screen deck 23. The screen is supported to the frame by pivoted support arms 25, 26 which forms a four-bar linkage together with the screen and the frame. The frame 1 comprises in this embodiment further a track base for moving the processing plant. The crusher or the screen, or both simultaneously can be operated in the processing plant 400 as the processing apparatus.

Figure 12:
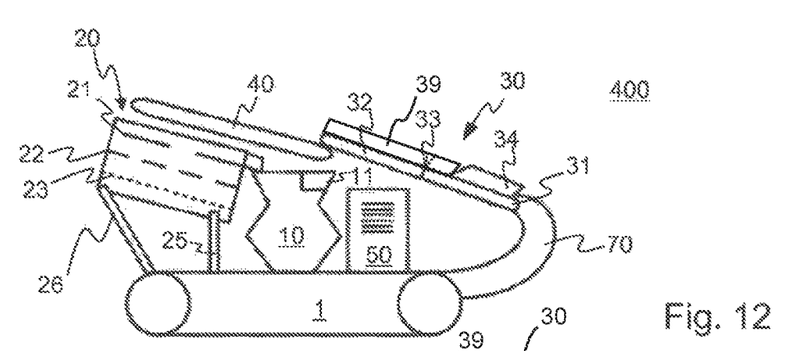
FIGS. 12-15 show a mineral material processing plant according to a fourth embodiment of the invention in different positions of the first conveyor.

In FIG. 12 the first conveyor 30 is during screening and crushing in the operation position feeding via a second conveyor 40 the screen 20 which feeds the crusher 10. Crushable material is brought from outside to the processing plant 400 into the feed hopper 34 of the first conveyor 30 or directly into the crusher 10 or in both 10, 34. The overs of the uppermost screen deck 21 is guided from the screen to the crusher. The screen 20 comprises support arms 25, 26 to move the screen and the second conveyor 40 to the operation position and away from the operation position.

Figure 13:
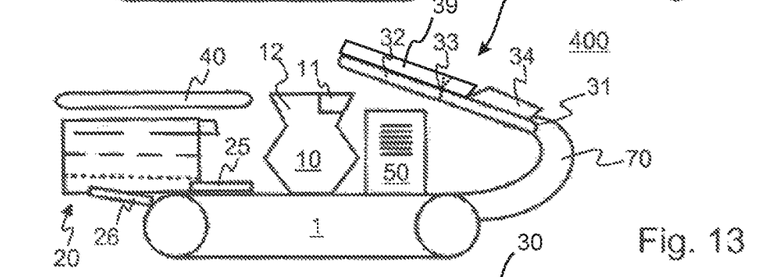

In FIG. 13 the first conveyor 30 of the processing plant 400 is in the operation position feeding directly the crusher 10 as in FIGS. 1 and 3. The screen 20 is not operated during the crushing in the position of FIG. 13. The screen 20 is moved away from the operation position by the support arms 25, 26 and supported by the support arms which are pivotable in the longitudinal direction of the plant 400, and lowered closer to a frame 1 of the plant, and the second conveyor 40 is moved away from a feeding connection of the first conveyor 30. Preferably a starting end of the second conveyor 40 is moved to the other side of the crusher than the first conveyor when viewed in the longitudinal direction of the plant, wherein the second conveyor can be lowered closer to the screen and the transport height of the plant 400 is decreasing.

In FIG. 14 the first conveyor 30 of the processing plant 400 is in the transport position pivoted to the second position (downwards). The second conveyor 40 is also in the transport position corresponding to the situation in FIG. 4. The discharge end of the second material transport part 32 of the first conveyor 30 is lowered, through an opening which is formed by an open pivoted side 11 of the feed hopper of the crusher 10, in between the sides of the feed hopper, preferably on the crusher. Then, the highest points of the first conveyor 30 and the second conveyor 40 are in a height which substantially does not exceed the height defined by the highest point of the processing apparatus.

Figure 15:
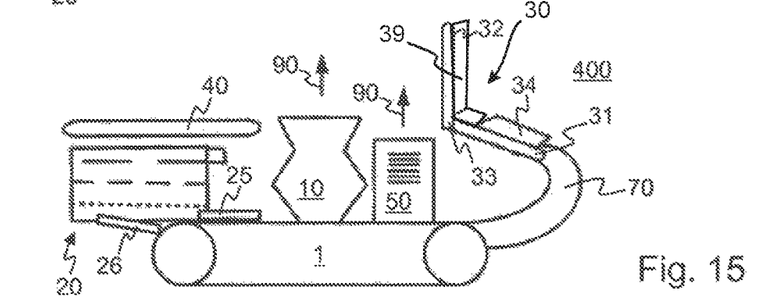

In FIG. 15 the discharge end of the second material transport part 32 is pivoted from the position of FIG. 13 to an opposite pivoting direction in relation to the first position (preferably vertically upwards) for example for service. In this third position the projection of the discharge end of the second material transport part is arranged to leave free the lifting centres of the crusher 10 and the motor module 50 when viewed from above. A lifting apparatus 90 such as a lifting rope and a gripping member do not hit the second material transport part 32 during lifting of the motor module 50. The third position enables the lifting of the crusher, a wear part of the crusher or the motor module without having to remove from place or detach the first conveyor 30. Preferably in the third position the projection of the discharge end when viewed from above does not meet the projection of the processing apparatus or the motor module, or is arranged to leave free the projection of the processing apparatus/motor module. Preferably, when the processing apparatus/motor module or a part thereof is lifted from a centre/gravity centre, a lifting space is freed up for a lifting wire at least at the gravity centre of the processing apparatus.

The processing plants presented above may also be entirely or partly wheel based or movable on legs instead of the track base. Alternatively the processing plant may be movable/towable for example by a truck or another external power source. Further to the above presented the processing plant may also be a stationary processing plant.

Also other types of actuators with changeable length may be used instead of the hydraulic actuator and the hydraulic cylinder such as worm screws or electric cylinders.

The foregoing description provides non-limiting examples of some embodiments of the invention. It is clear to a person skilled in the art that the invention is not restricted to details presented, but that the invention can be implemented in other equivalent means.

Some of the features of the above-disclosed embodiments may be used to advantage without the use of other features. As such, the foregoing description shall be considered as merely illustrative of principles of the invention, and not in limitation thereof. Hence, the scope of the invention is only restricted by the appended patent claims.

The invention claimed is:

1. A mineral material processing plant comprising a mineral material processing apparatus and a first conveyor, the first conveyor being arranged to feed the processing apparatus during operation of said processing apparatus, the first conveyor comprising a first material transport part, a second material transport part and a pivot by which the second material transport part is fixed pivotably in relation to the first material transport part,
    wherein the second material transport part is movable to an operation position in which the first material transport part and the second material transport part are parallel to each other such that the transported material is arranged to be fed via a discharge end of the second material transport part to the processing apparatus;
    wherein the second material transport part is movable to a service position which is in a first pivoting direction in relation to the operation position, and wherein, in the service position, a projection of the discharge end of the second material transport part is arranged to leave free a lifting center of the processing apparatus when viewed from above; and
    wherein the second material transport part is movable to a transport position which is in a second pivoting direction in relation to the operation position, wherein the second pivoting direction is opposite to the first pivoting direction, and wherein, in the transport position, the discharge end of the second material transport part is close to the processing apparatus and at a transport height which does not exceed a height which is defined by the highest point of the processing apparatus and a feed hopper of the processing apparatus during operation thereof.

2. The processing plant according to claim 1, wherein the processing apparatus is a crusher or a screen, or includes both the crusher and the screen.

3. The processing plant according to claim 1, comprising, as a first processing apparatus a crusher and as a second processing apparatus a screen.

4. The processing plant according to claim 1, wherein the operation position between the transport position and the service position further comprises a feeding position of the second material transport part to a second conveyor which is connected in succession to the first conveyor and arranged to feed a second processing apparatus.

5. The processing plant according to claim 1, comprising as the processing apparatus, a crusher and further a motor module which is beside the crusher and the material feeding by the second material transport part is arranged above the motor module.

6. The processing plant according to claim 5, wherein in the service position the projection of the discharge end of the second material transport part is arranged to leave free a lifting centre of the motor module when viewed from above.

7. The processing plant according to claim 1, wherein the first conveyor comprises a hydraulic actuator or a pair of hydraulic actuators which is arranged to pivot the second material transport part in relation to the first material transport part.

8. The processing plant according to claim 1, wherein the first conveyor comprises a dust cover which is formed on the first and second material transport parts and which is foldable at the pivot.

9. The processing plant according to claim 1, wherein the first conveyor comprises a feed hopper for feeding material to the processing plant.

10. The processing plant according to claim 1, wherein the first conveyor comprises an endless transport member which is forming a continuing transport surface over the first material transport part and the second material transport part.

11. The processing plant according to claim 1, wherein the first conveyor comprises a first endless transport member in the first material transport part and a second endless transport member in the second material transport part, said endless transport members are forming successive transport surfaces over the first conveyor.

12. The processing plant according to claim 1, further comprising a processing apparatus feed hopper which comprises an open pivotable side, and wherein the discharge end of the first material transport part is set in the transport position in between the sides of the feed hopper through the open pivotable side.

13. The processing plant according to claim 1, wherein the mineral material processing plant is a movable crushing plant.

14. A method for operating a mineral material processing plant comprising the following steps: providing a mineral material processing apparatus and a first conveyor by which the processing apparatus is fed during operation of said processing apparatus, the first conveyor comprising a first material transport part, a second material transport part and a pivot by which the second material transport part is fixed pivotably in relation to the first material transport part:
    pivoting the second material transport part to an operation position for a time of operation, in which operation position the first material transport part and the second material transport part are parallel to each other such that the transported material is be fed via a discharge end of the second material transport part to the processing apparatus;
    pivoting the second material transport part to a service position in a first pivoting direction in relation to the operation position, wherein the projection of the discharge end of the second material transport part leaves free the lifting center of the processing apparatus when viewed from above; and
    pivoting the second material transport part for the time of the transport to a transport position which is, compared to the service position, in an second opposite pivoting direction of the second material transport part in relation to the operation position wherein the discharge end of the second material transport part is close to the processing apparatus and at a transport height which does not exceed a height which is defined by the highest point of the processing apparatus and a feed hopper of the processing apparatus during operation thereof.

15. The method according to claim 14, wherein the processing plant is operated in a crushing mode with a crusher or in a screening mode with a screen, or is operated both in crushing and screening modes.

16. The method according to claim 14, further comprising feeding in the operation position material by the second material transport part to a second conveyor which is connected in succession to the first conveyor and by which second conveyor is fed a second processing apparatus.

17. The method according to claim 14, further comprising pivoting the second material transport part in relation to the first material transport part by a hydraulic actuator or a pair of hydraulic actuators.

18. The method according to claim 14, further comprising opening an open pivotable side of a feed hopper comprised by the processing apparatus, and setting in the transport position the discharge end of the first material transport part in between the sides of said feed hopper through the open pivotable side.

* * * * *